Jan. 22, 1957   M. C. ARF   2,778,043
ROTARY POLISHING DEVICE HAVING MEANS TO ILLUMINATE THE WORK
Filed Sept. 11, 1953
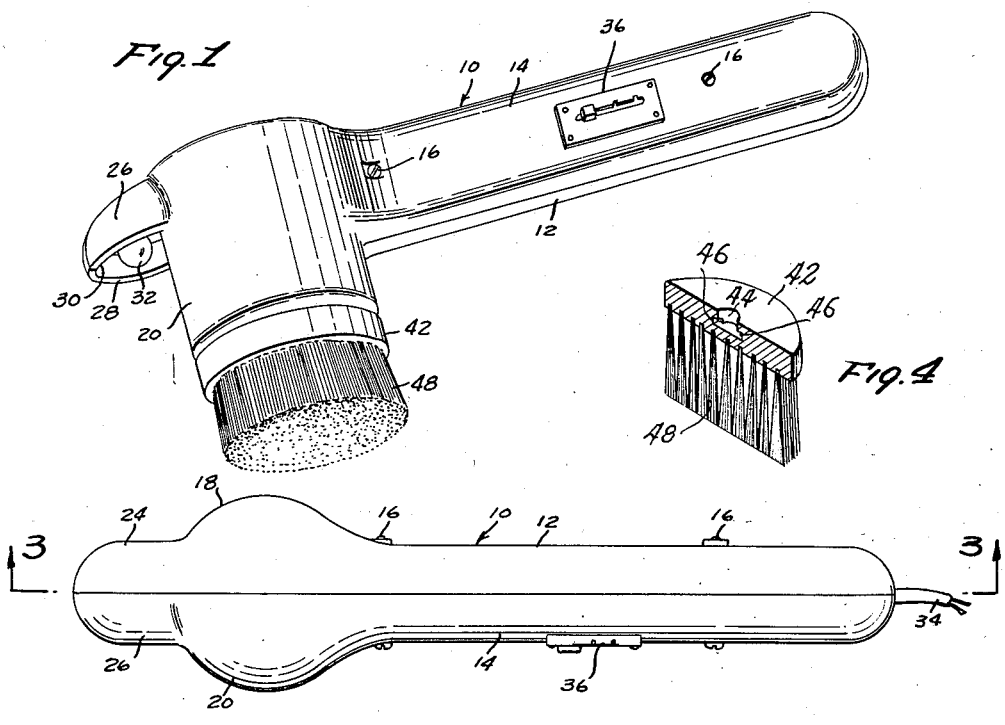
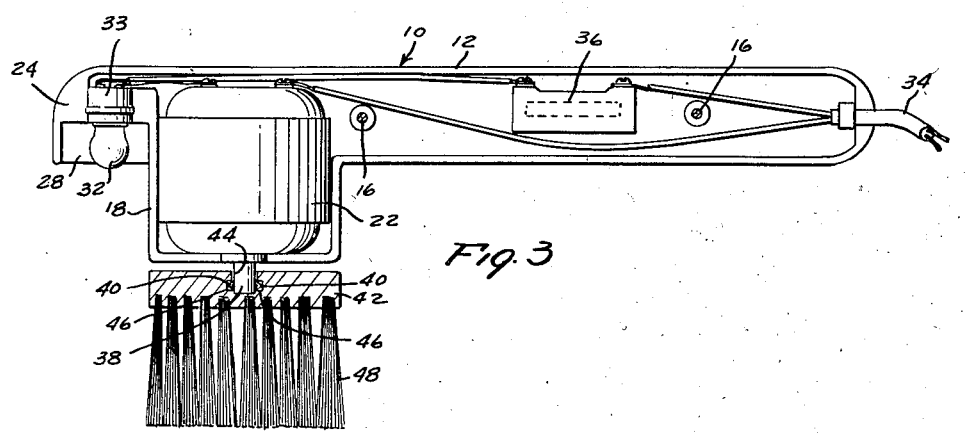
INVENTOR.
MYRON C. ARF
BY
McMorrow, Berman + Davidson
ATTORNEYS

United States Patent Office 2,778,043
Patented Jan. 22, 1957

2,778,043

ROTARY POLISHING DEVICE HAVING MEANS TO ILLUMINATE THE WORK

Myron C. Arf, Minneapolis, Minn.

Application September 11, 1953, Serial No. 379,572

1 Claim. (Cl. 15—28)

This invention relates to improvements in portable power-driven polishing devices, especially but not exclusively, for polishing shoes, and having means for illuminating the work.

An important object of this invention is to provide an improved device of the character indicated above which is easily manipulable and is simple in construction.

Other objects will appear from the following description, the claim appended thereto, and from the annexed drawing, in which like reference characters designate like parts throughout the several views, and wherein:

Figure 1 is a perspective view of a shoe polishing device formed in accordance with the present invention;

Figure 2 is a top plan view;

Figure 3 is a longitudinal sectional view taken substantially on line 3—3 of Figure 2; and Figure 4 is a fragmentary, perspective view of one of the polishing brushes.

The illustrated device comprises a hollow casing 10, preferably formed from relatively thin sheet metal, molded plastic or the like. The casing 10 is of sectional construction, and in the illustrated example includes a pair of complementary, facing sections recessed throughout their length, said sections meeting along a line extending longitudinally and centrally of the casing. The sections have been designated by the reference numerals 12 and 14 respectively, and are detachably and fixedly connected to one another in the manner referred to above by means of screws 16 extending transversely of the casing at selected locations taken longitudinally thereof.

The casing is so formed as to define, at one end thereof, an elongated, straight flat handle which can be conveniently grasped by a user, and the handle terminates at one end in an enlarged cylindrical motor housing with its axis at right angles to the handle. The housing is formed by enlarged portions 18 and 20, respectively, of the casing sections. The transversely enlarged portions have curved outer walls, so that said portions 18, 20 cooperate in defining the generally cylindrical motor housing, within which is disposed a conventional electric motor 22. The motor 22 is, of course, fixedly secured in suitable manner within one of the casing sections, so as to prevent vibration thereof during use of the device.

Integral with the motor housing portions 18, 20 at the side thereof opposite the handle, and extending longitudinally of the casing in alignment with the handle portions of the casing sections, are relatively short, downwardly facing, recessed portions 24, 26. These, when the casing sections are joined in the manner hereinbefore described, cooperate to provide a downwardly opening bulb shield having depending flanges 28, 30 located at opposite sides of a downwardly extended bulb 32. Bulb 32 could be a flashlight bulb or the like, and is engageable in a bulb socket 33 that is mounted in confronting recesses formed in the portions 24, 26.

An electric cord 34 extends through the free end of the handle of the device, from a suitable source of electric power, such as a conventional house circuit. The cord 34, within the casing, has one conductor extending to one side of a conventional switch 36. Switch 36 has a plate disposed exteriorly of the casing, the switch plate being mounted upon the casing section 14. As will be noted from Figure 1, the switch is of the three position type, the left hand position in Figure 1 being an "off" position, the middle position being a "slow" speed position, and the right hand position being a "fast" speed position.

In circuit with the switch, within the casing, are the bulb 32 and motor 22, the circuit arrangement being such as to cause the bulb to be energized conjointly with energizing of the motor 22.

The shaft 38 of the motor extends downwardly from the motor housing, the motor shaft being arranged axially of said motor housing. The motor shaft 38 is provided, at diametrically opposite locations thereupon, with spring keys 40. The keys 40, as shown in Figure 3, are of V-shape formation, and it will be understood that the keys 40 are disposed in diametrically opposite recesses provided in the shaft 38, with the spring keys being spring urged radially and outwardly of the motor shaft to the positions thereof shown in Figure 3. The keys can, however, be forced radially and inwardly of the motor shaft, against the opposing spring action thereof, when a brush 42 is being applied to or removed from the motor shaft.

The brush 42, in the illustrated example of the invention, includes a head of generally flat, circular formation, and includes a center opening 44 receiving the motor shaft. The center opening 44 is formed, inwardly from the upper end thereof, with diametrically opposed key slots 46 which are adapted to receive the keys 40, thus to connect the brush 42 to the motor shaft for rotation with the motor shaft.

The brush 42 can include any type of polishing or cleaning means, and in the illustrated example of the invention the brush head has one face thereof provided with depending bristles 48. Instead of bristles 48, a lamb's wool bonnet or similar polishing device could be applied to the head 42, and it is considered to be part of the present invention that a plurality of rotary heads would be provided with the shoe polishing device, each head being different from each other head and being used for a particular purpose. For example, one rotary head could be used for applying polish to shoes, and this head would be rotated at a slow speed during use of the device. A second head would be used for shining the shoe surface after the polish has been applied thereto, and said second head could be formed like the one shown in the drawing. Still another head might be provided with the device, having a soft wool surface to apply a high sheen or gloss to the polished shoe.

In any event, it is considered to be an important characteristic of the invention that the device is highly compact, and can be manufactured at relatively low cost considering the versatility thereof and the adaptability thereof for cleaning and polishing shoes and other footwear. It is also considered to be an important feature of the invention that the brush heads can be swiftly attached to or detached from the motor shaft, this being of importance since more than one head would ordinarily be used during the polishing of a single pair of shoes. The substitution of the rotary heads should, of course, be effected with as much rapidity as possible, and with a minimum amount of difficulty.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

In a polishing device, a hollow casing comprising an elongated flat handle having a free end and another end, said other end terminating in an enlarged cylindrical housing extending crosswise of the handle and projecting beyond one side of the handle, said casing further including a lamp shield on the side of the housing remote from the handle, said housing having an outer end and said shield having an open side facing in the same direction in which said cylindrical housing extends, an electric motor enclosed in said housing having a shaft extending axially of said housing and projecting axially beyond said outer end of the housing, a brush secured to said shaft beyond the outer end of the housing, an electric bulb mounted within said shield, and energizing means connected to said motor and said bulb.

References Cited in the file of this patent

UNITED STATES PATENTS

| | | |
|---|---|---|
| 1,425,829 | Beggs | Aug. 15, 1922 |
| 1,460,765 | Norris | July 3, 1923 |
| 1,562,377 | Spielman | Nov. 17, 1925 |
| 1,569,167 | Anderson | Jan. 12, 1926 |
| 1,828,388 | Bustos | Oct. 20, 1931 |
| 2,185,229 | Scott | Jan. 2, 1940 |
| 2,200,322 | Arnesen | May 14, 1940 |
| 2,210,094 | Mueller | Aug. 6, 1940 |
| 2,517,882 | Johnson | Aug. 8, 1950 |

FOREIGN PATENTS

| | | |
|---|---|---|
| 228,040 | Great Britain | Jan. 29, 1925 |
| 363,768 | Italy | Oct. 12, 1938 |
| 498,795 | Belgium | Feb. 15, 1951 |